United States Patent
Liu

(10) Patent No.: US 9,696,871 B2
(45) Date of Patent: Jul. 4, 2017

(54) METHOD AND PORTABLE TERMINAL FOR MOVING ICON

(71) Applicant: Samsung Electronics Co., Ltd., Gyeonggi-do (KR)

(72) Inventor: Li Liu, Tianjin (CN)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 206 days.

(21) Appl. No.: 14/280,455

(22) Filed: May 16, 2014

(65) Prior Publication Data

US 2015/0089410 A1    Mar. 26, 2015

(30) Foreign Application Priority Data

Sep. 23, 2013    (CN) .......................... 2013 1 0437327

(51) Int. Cl.
*G06F 3/048*     (2013.01)
*G06F 3/0481*    (2013.01)
*G06F 3/0484*    (2013.01)
*G06F 3/0488*    (2013.01)
*G06F 3/0486*    (2013.01)

(52) U.S. Cl.
CPC ........ *G06F 3/04817* (2013.01); *G06F 3/0486* (2013.01); *G06F 3/0488* (2013.01); *G06F 3/04842* (2013.01); *G06F 3/04845* (2013.01)

(58) Field of Classification Search
CPC ..................................................... G06F 3/048
See application file for complete search history.

(56) References Cited

U.S. PATENT DOCUMENTS

| 8,661,369 | B2 * | 2/2014 | Heo ...................... | G06F 3/0481 340/10.1 |
| 2006/0048069 | A1 * | 3/2006 | Igeta .................... | G06F 3/0486 715/769 |
| 2012/0072871 | A1 * | 3/2012 | Seo ........................ | H04N 5/445 715/838 |
| 2013/0007666 | A1 | 1/2013 | Song et al. | |

(Continued)

FOREIGN PATENT DOCUMENTS

| CN | 102221931 | 10/2011 |
| CN | 102681778 | 9/2012 |

(Continued)

OTHER PUBLICATIONS

First Office Action dated Dec. 29, 2015 in connection with Chinese Application No. 201310437327.0, 10 pages.

*Primary Examiner* — Xuyang Xia

(57) ABSTRACT

A method for moving an icon includes when a plurality of pages are simultaneously displayed on an interface in a thumbnail form, selecting a start page including a plurality of icons to be moved to a target page; moving the start page to the target page and the two pages are overlapped, detecting the overlapping ratio of two pages and/or the duration of the overlapping state, comparing the number of vacant spots within the target page with the number of all of icons within the start page, and adding all of icons within the start page to the vacant spots within the target page when the number of vacant spots within the target page is more than or equal to the number of all of icons within the start page. Other various embodiments including a portable terminal for moving an icon also are disclosed.

14 Claims, 5 Drawing Sheets

(56) References Cited

U.S. PATENT DOCUMENTS

| | | |
|---|---|---|
| 2014/0015786 A1 | 1/2014 | Honda |
| 2014/0289669 A1 | 9/2014 | Wang |
| 2014/0365948 A1* | 12/2014 | Tanaka .................. G06F 3/0483 715/775 |
| 2015/0143272 A1 | 5/2015 | Wu |
| 2015/0212691 A1* | 7/2015 | Wang .................... G06F 3/0481 715/838 |

FOREIGN PATENT DOCUMENTS

| | | |
|---|---|---|
| CN | 102760043 | 10/2012 |
| CN | 102981704 | 3/2013 |
| CN | 102999249 | 3/2013 |
| WO | WO 2012/133576 A1 | 10/2012 |

* cited by examiner

METHOD AND PORTABLE TERMINAL FOR MOVING ICON

CROSS-REFERENCE TO RELATED APPLICATION AND CLAIM OF PRIORITY

The present application is related to and claims the benefit under 35 U.S.C. §119(a) of a Chinese patent application No. 201310437327.0 filed on Sep. 23, 2013 in the Chinese Patent Office, the entire disclosure of which is hereby incorporated by reference.

TECHNICAL FIELD

The present disclosure relates to a method for moving icon, more particularly, to an icon moving method capable of one-time moving a plurality of icons from a start page to a target page and a touch-type portable terminal to which the method is applied.

BACKGROUND

With the rapid spread of intelligent portable terminals, the development of various applications for these intelligent portable terminals is also quite rapid. Nowadays, every intelligent portable terminal is mounted with many applications, resulting in being much trouble for a user to use a certain application. Hence, the classification management for these icons is necessary.

When respective icons are performed the classification management, the best mode is placing the icons of the similar types or the frequently used icons on one page. But if every icon needs to be moved, it is much inconvenient to the current touch-type portable terminals. For example, the following method is used when moving the icons on the touch-type portable terminals. One way is pressing and holding an icon using a touch tool and dragging an icon to a desired page. But the disadvantage of this kind of operation is difficult to select a page. Another way is pressing and holding an icon after opening a floating window item and turning page according to a sensor to find the corresponding position and releasing the icon. Although such method is more convenient than the previous method, it is necessary to operate a single icon. Thus, where there are many icons, if only one icon is moved once, it is rather tedious. Also, the icon is easy to be out of the control of the touch tool when dragging an icon using the touch tool.

SUMMARY

To address the above-discussed deficiencies, it is a primary object to provide a method for moving an icon in a portable terminal in order to carry out the above object. The method includes when a plurality of pages are simultaneously displayed on an interface in a thumbnail form, selecting a start page including one or more icons to be moved to a target page, moving the start page to the target page and two pages are overlapped, detecting an overlapping ratio of two pages and/or the duration of the overlapping state, comparing the number of vacant spots within the target page with the number of all of icons within the start page when the overlapping ratio of two pages is less than a predetermined value and/or the duration of an overlapping state reaches a predetermined time; adding all of icons within the start page to the vacant spots within the target page when the number of vacant spots within the target page is more than or equal to the number of all of icons within the start page.

According to another aspect of the present disclosure, there is provided a method for moving an icon in a portable terminal in order to carry out the object. The method includes the following steps: selecting one or more icons within a start page to be moved to a target page, when a plurality of pages are simultaneously displayed on an interface in a thumbnail form, selecting the start page; moving the start page to the target page and the two pages are overlapped, detecting the overlapping ratio of two pages and/or the duration of the overlapping state, adding at least one icon within the start page to the vacant spots of the target page when the overlapping ratio of two pages is less than a predetermined value and/or the duration of the overlapping state reaches a predetermined time;

According to another aspect of the present disclosure, there is provided a portable terminal having an interface display unit for displaying icons and a start page including one or more icons and a touch detection unit for detecting a touch operation on the start page or the icon in order to carry out the object. The portable terminal includes a processing circuitry configured to move the start page or the icon according to the guide of a touch tool when the touch of a user on the start page or the icon exceeds a predetermined time, detect the overlapping ratio of the start page and the target page when the start page moves to overlap a part of the target page, compare the number of vacant spots within the target page with the number of the selected icons within the start page when the overlapping ratio is less than a predetermined value, and add at least one icon within the start page to the vacant spots of the target page.

According to the icon moving method and the portable terminal to which the method is applied provided by the present disclosure, since all of or a plurality of icons within one page can be one-time moved to another page completely, the icon management efficiency of the portable terminal may be accordingly improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Embodiments of the present disclosure will be described in detail below by referring to the accompany drawings. A smart phone is taken as an example of a touch-type portable terminal in the below explanations, however, the present disclosure is not limited to it, but further includes other touch-type portable terminals such as a tablet computer, an intelligent camera or a notebook computer, etc.

Figure 1:
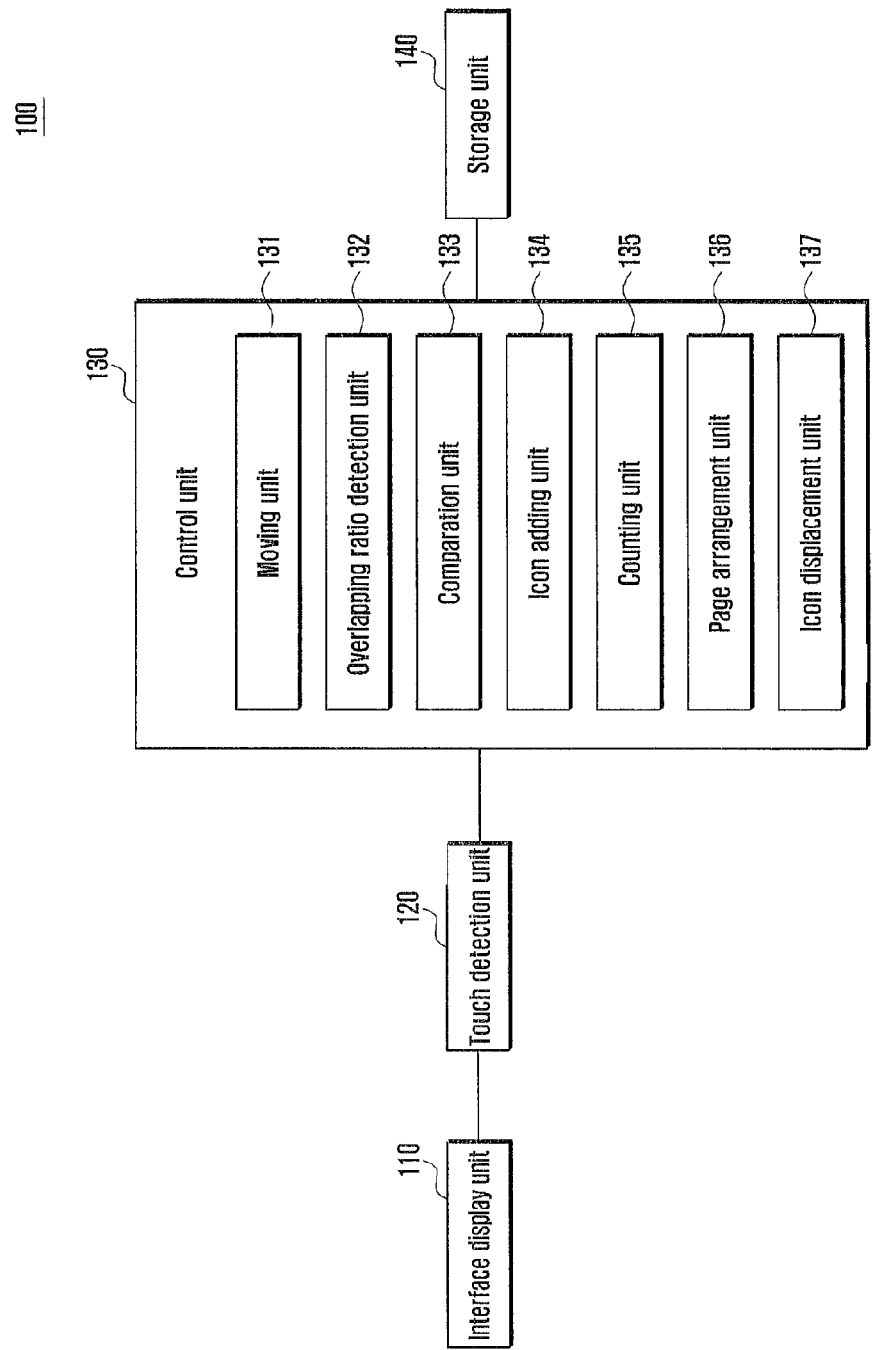
FIG. 1 is a block diagram illustrating the constitution of a touch-type portable terminal according to the present disclosure.
Figure 2A:
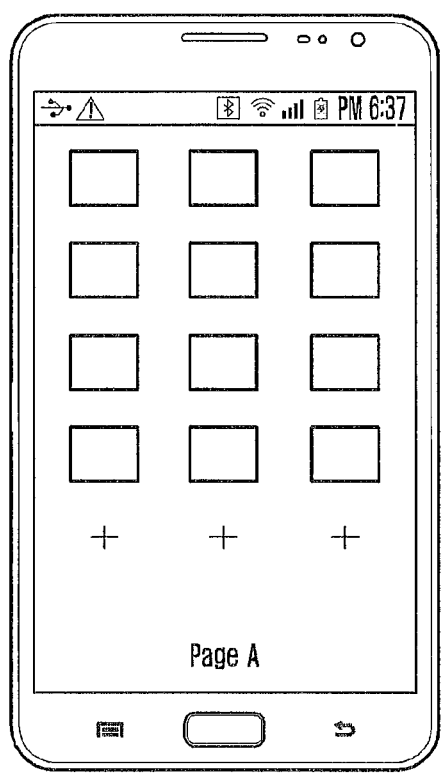
FIGS. 2A and 2B are a diagram of pages of a touch-type portable terminal according to the present disclosure.
Figure 2B:
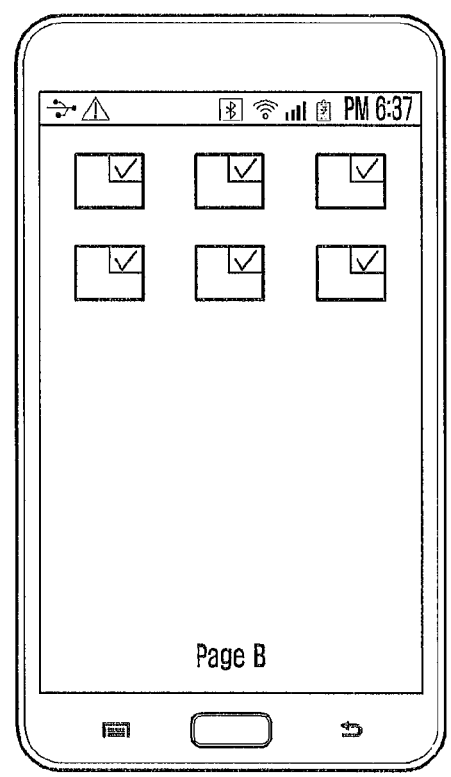
Figure 3:
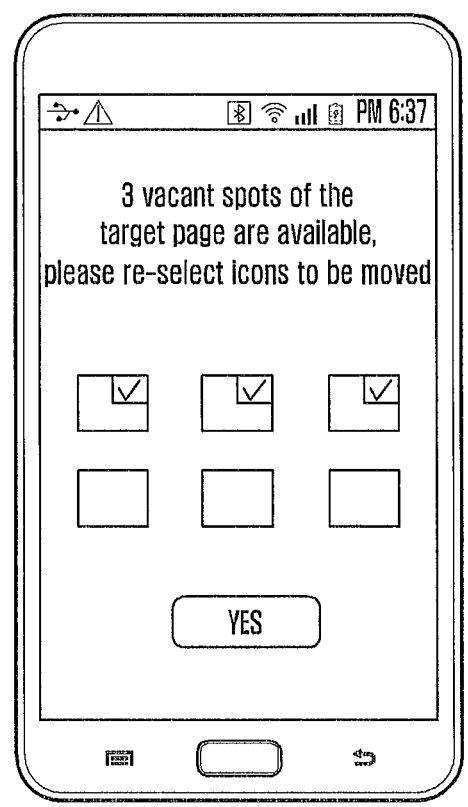
FIG. 3 is a diagram of a pop-up window of a touch-type portable terminal according to the present disclosure.

FIG. 1 is a block diagram illustrating the constitution of a touch-type portable terminal according to the present disclosure. FIG. 2 is a diagram of pages of a touch-type portable terminal according to the present disclosure. FIG. 3 is a diagram of a pop-up window of a touch-type portable terminal according to the present disclosure.

As illustrated in FIG. 1, the touch-type portable terminal 100 (hereinafter referred to as the portable terminal) according to the present disclosure includes an interface display unit 110, a touch detection unit 120, a control unit 130 and a storage unit 140.

The interface display unit 110 displays various user interfaces of the portable terminal, especially a page including a plurality of icons. Herein, in the present disclosure, icons indicate graphic symbols representing various applications or file folders mounted on the portable terminal, and pages indicate images displaying these icons on a screen of the portable terminal. A plurality of pages may be simultaneously displayed (zoomed) on the picture of the portable terminal in a zooming mode of the portable terminal.

Moreover, the number of icons which are contained in each page is limited. For example, as illustrated in FIGS. 2A and 2B, a plurality of icons are contained in an array manner, one page, for example, can contain 15 (5 rows*3 columns) icons. Here, only three vacant spots remain in FIG. 2A, i.e. at most three icons can be added (or, copied and pasted).

The touch detection unit 120 detects touches on various pages or icons through a touch tool. one or more icons can be selected within one page through the touch tool, or the page is operated in a zooming mode of the portable terminal. Here, the touch tool can be a finger of a user and can also be a special tool such as a stylus. When the time of touching one icon or one page in a zooming mode exceeds a predetermined time, the icon or the file folder can be dragged, and accordingly the icon or file folder can be placed in an appropriate position.

The control unit 130, for example, can be a central control unit (CPU), a processor, a processing circuitry, or a microprocessor, which can include a moving unit 131, an overlapping ratio detection unit 132, a comparison unit 133, an icon adding unit 134, a counting unit 135, a page arrangement unit 136 and an icon displacement unit 137.

The moving unit 131 moves a page or an icon. For example, when the touch tool presses a page in a zooming mode of a page or presses an icon and rapidly drags in a normal mode, the moving unit 131 can enable the page or icon to move as guided by the touch tool.

The overlapping ratio detection unit 132 detects the overlapping ratio of two pages, i.e. detecting the overlapping ratio of the two pages when the two pages overlap. Preferably, the overlapping ratio is an area overlapping ratio. Specifically, when a certain page is dragged to another page by the touch tool so as to start to cover the page in a page zooming mode of the portable terminal, the overlapping ratio detection unit 132 detects whether the overlapping ratio (such as an area overlapping ratio) of the two pages is less than a predetermined value. Preferably, the predetermined value is 50%.

Moreover, a timing unit (not illustrated in the drawings) can be further included in the present disclosure to detect the duration of the overlapping state of the two pages when one page is moved to overlap a part of another page.

In the embodiment, when the overlapping ratio is less than a predetermined value and/or the duration of the overlapping state of two pages is longer than a predetermined time, the control unit 130 can determine it as an operation of moving a plurality of icons within the page. Here, preferably, all of icons within the page can be changed into a selected state. However, when the overlapping ratio is more than a predetermined value or the duration of the overlapping state of two pages does not reach a predetermined time, the control unit 130 can determine it as an operation of transforming the position of the page. Here, the predetermined time can be voluntarily set by a user and can also be directly applied by the factory setting.

The comparison unit 133 compares the icon number in a start file folder of a plurality of icons within a page with the number of vacant spots within the target page. Specifically, the number of icons within the start page is compared with the number of vacant spots within the target page when the overlapping ratio of a start page and a target page is less than a predetermined value. At most all of icons within the start page can be placed on the vacant spots within the target page when the number of vacant spots within the target page is more than or equal to the number of icons within the start page. Here, the number of icons within the start page can be the number including all of icons of the start page and can also be the number of icons that are pre-selected to be moved to the target page.

A counting unit 135 can be further included in the present disclosure in order to calculate the number of icons within a start file folder or the number of vacant spots within the target page. The counting unit 135 can calculate the number of all of icons within a start page and can also calculate the number of the selected icons within the start page. Here, the calculation result is output to the comparison 133 when the number of icons within the start page or the number of vacant spots within the target page is calculated.

For example, supposing that the page B displayed in FIG. 2B is a start page and the page A displayed in FIG. 2A is a target page, the counting unit 135 can calculate the number of icons to be moved in page B that is the start page to be 6, and simultaneously calculate the number of vacant spots in page A that is the target page to be 3.

Accordingly, the comparison result of the comparison unit 133 is that the number of vacant spots within the target page is less than the number of icons within the start page, the interface display unit 110 can hereby display a pop-up window as illustrated in FIG. 3 so as to re-select the targets to be moved from the start page to the target page.

The icon adding unit 134 adds at least one icon within the start page to the vacant spot of the target page. Or, the icon adding unit 134 can place at least one icon within the target page within the start page according to the operation of the icon displacement unit 137 described below.

The page arrangement unit 136 arranges a page environment on the interface displayed by the portable terminal, for example, when the start page is dragged to the target page and overlaps with the target page in a zooming mode, and the overlapping ratio is more than the predetermined value, the page arrangement unit 136 arranges the start page in front of the target page. Or, the page arrangement unit 136 can arrange a plurality of icons within one page, for example, the arrangement positions of a plurality of icons within one page can be changed through the operation of the touch tool.

The icon displacement unit 137 displaces the icons of the start page and the target page. That is, only icons within one page can be added to another page through the icon adding unit 134, however, the icon displacement unit 134 can add icons within another page to one page while adding the icons within the one page to said another page.

For example, the positions of a plurality of icons of the start page can be exchanged with the positions of icons of the target page through the icon displacement unit 137. Accordingly, when the comparison result of the comparison unit 133 is that the number of vacant spots within the target page is less than the number of icons to be moved within the start page, all of icons to be moved within the start page can be added to the target page simultaneously without re-selecting icons by displacing the unnecessary icons within the target page to the start page.

That is, the icon displacement unit 137 can also function to add icons within one page to another page in the present disclosure. The process of re-selecting icons to be moved can be omitted through the icon displacement unit 137.

Moreover, as above said, when the comparison result of the comparison unit 133 is that the number of vacant spots within the target page is less than the number of icons within the start page to be moved to the target page or the number of the selected icons within the start page, the interface display unit 110 can display a pop-up window. Here, the pop-up window can inform that the spots of the target page are insufficient, please re-select the icons to be moved, and the user can accordingly re-select icons to be moved. Here, in order to improve the efficiency, the number of vacant spots of the target page detected by the counting unit 135 can also be prompted while insufficient spot is prompted, for example, the prompt information can be changed such that 3 vacant spots of the target page are available, please re-select icons to be moved, as illustrated in FIG. 3.

Alternatively, when the comparison result of the comparison unit 133 is that the number of vacant spots within the target page is less than the number of icons within the start page to be moved to the target page or the number of the selected icons within the start page, the icon adding unit 134 can voluntarily add the front icons ranked in the start page to the vacant spots of the target page according to a default mode based on the number of vacant spots within the target page detected by the counting unit 135, the rest icons of the start page which cannot be added to the target page remain in the start page.

The storage unit 140 includes a database storing information, for example, names of respective pages, names of icons included in respective pages, coordinates of respective icons in a page, etc. Thus, when icons move so that arrangements of icons in respective pages is changed, various information about pages and icons in the database are updated at the same time.

The icon moving method of the touch-type portable terminal of the present disclosure is particularly explained as below.

Figure 4:
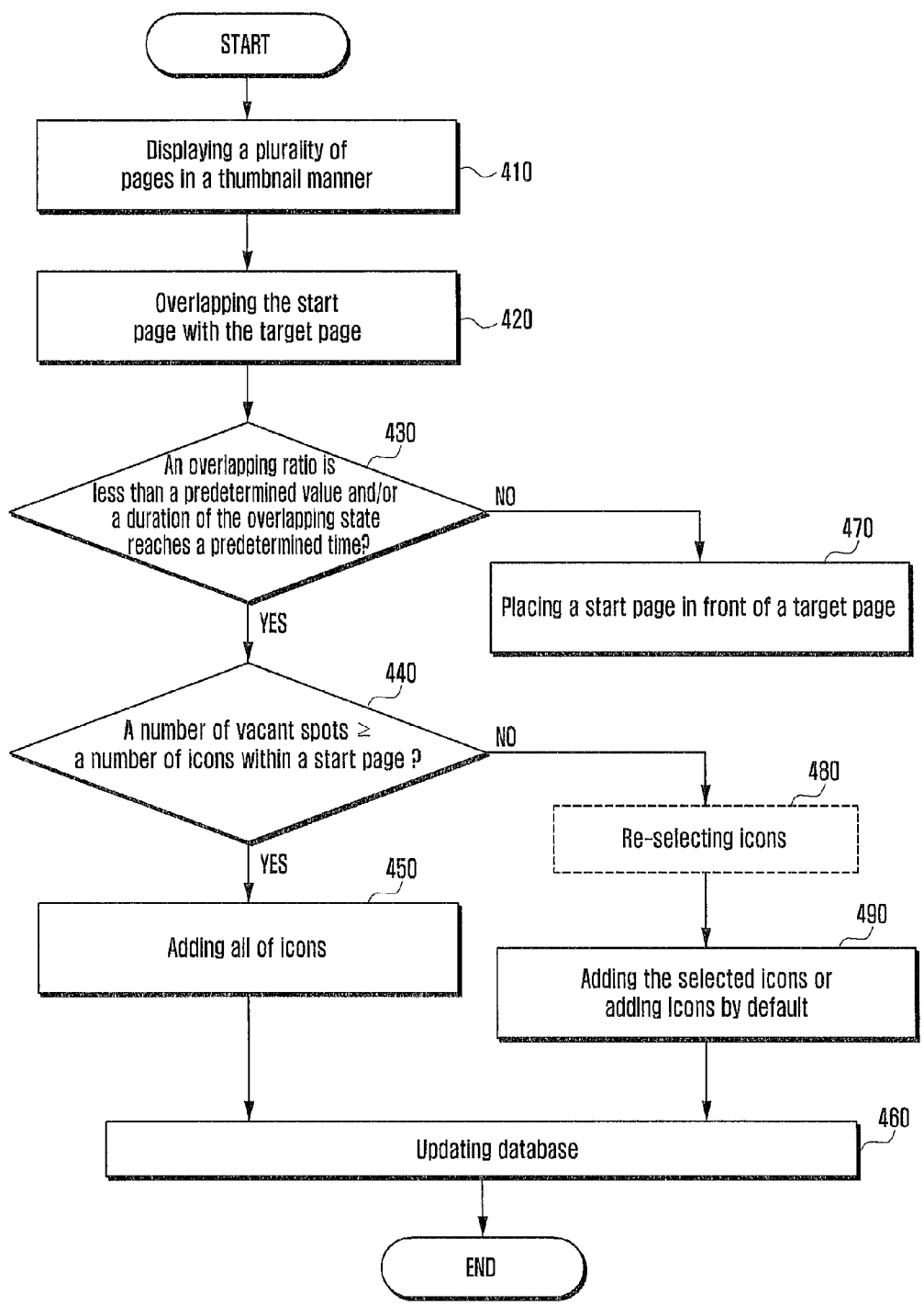
FIG. 4 is a flowchart of an icon moving method of a touch-type portable terminal according to the first embodiment of the present disclosure.

FIG. 4 is a flowchart of an icon moving method of a touch-type portable terminal according to the first embodiment of the present disclosure. The embodiment is that all of icons within one page need to be moved to another page.

In step 410, when a plurality of pages are displayed on the interface of the portable terminal in a thumbnail form, the start page including a plurality of icons to be moved to the target page is selected. Here, the touch tool presses the start page, the touch detection unit 120 detects whether the touch exceeds the predetermined time, when the touch exceeds the predetermined time, the page can be dragged through the touch tool.

Then in step 420, the start page is moved to the target page, and the start page overlaps with the target page. Then entering into step 430, the overlapping ratio of the start page and the target page is detected. Here, the overlapping ratio can be an area overlapping ratio, however, the present disclosure is not limited thereto.

Alternatively, the duration of the overlapping state of the start page and the target page can be detected simultaneously or individually in step 430.

When the overlapping ratio of the start page and the target page is less than the predetermined value and/or the duration of the overlapping state is longer than the predetermined time, entering into Step 440, the number of vacant spots within the target page is compared with the number of icons within the start page. Here, preferably, the step of calculating the number of vacant spots within the target page and the number of icons within the start page is further included before step 440.

When the overlapping ratio of the start page and the target page is more than the predetermined value, entering into step 470, the start page is placed in front of the target page. That is, when the overlapping ratio of the start page and the target page is more than the predetermined value, only the position transformation operation between pages is performed.

Preferably, the predetermined value of the overlapping ratio is 50%. Although in the present embodiment, the moving operation of a plurality of icons is set to be performed in the case of the overlapping ratio being less than the predetermined value, and the position transformation operation of pages is set to be performed in the case of the overlapping ratio being more than the predetermined value, the present disclosure is not limited thereto, the position transformation operation can be set to be performed in the case of the overlapping ratio being less than the predetermined value, and the moving operation of a plurality of icons is set to be performed in the case of the overlapping ratio being more than the predetermined value, thus, the predetermined value of the overlapping ratio can be various values.

When the comparison result of step 440 is that the number of vacant spots of the target page is more than or equal to the number of icons of the start page, entering into step 450, all of icons of the start page are added to the vacant spots of the target page.

When the comparison result of step 440 is that the number of vacant spots of the target page is less than the number of icons of the start page, entering into step 480, the icons to be moved are re-selected according to the prompt of a pop-up window. Here, the pop-up window can prompt the number of vacant spots of the current target page. After the icons are re-selected and determined according to the number of vacant spots of the target page, entering into step 490, the selected icons are added to the vacant spots of the target page.

Alternatively, the above step 480 can be omitted and step 490 is directly performed, here, step 490 can be performed to add the front icons ranked in the start page are added to the target page by default according to the number of the vacant spots of the target page. Accordingly, Step 480 can be omitted to further improve efficiency.

Thus, entering into step 460, various information about pages and icons in the database are updated.

Figure 5:
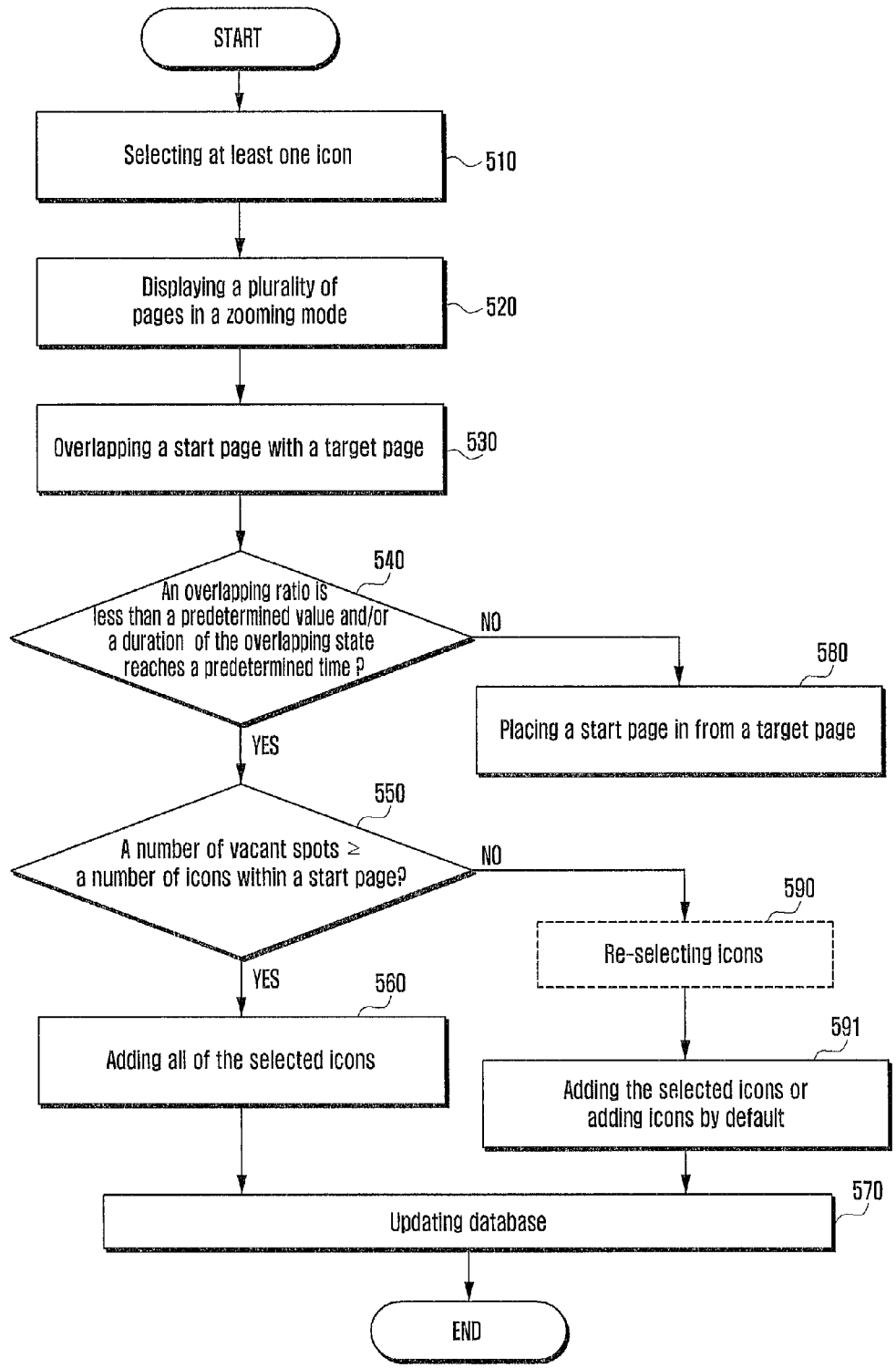
FIG. 5 is a flowchart of an icon moving method of a touch-type portable terminal according to the second embodiment of the present disclosure.

FIG. 5 is a flowchart of moving an icon on a touch-type portable terminal according to the second embodiment of the present disclosure. The embodiment is that a plurality of or all of icons within one page are moved to another page.

In step 510, at least one icon within start page to be moved is selected. Here, the method of selecting at least one icon within the start page can be various. For example, a plurality of icons are selected using the touch tool after entering into an icon selection mode through an entity/virtual menu of the portable terminal or a preset gesture made by the fingers of a user.

Then, entering into step 520, respective pages on the interface of the portable terminal are in a zooming state. Here, there are many methods of displaying respective pages in a thumbnail manner, for example, respective pages are displayed in a thumbnail manner through a preset gesture made by the fingers of a user.

Next, entering into step 530, the start page overlaps with the target page in a manner that the start page is moved by the touch tool.

Then, the overlapping ratio of the start page and the target page is detected. Here, the overlapping ratio can be an area overlapping ratio, however, the present disclosure is not limited thereto.

Alternatively, the duration of the overlapping state of the start page and the target page can be detected simultaneously or individually in step 540.

When the overlapping ratio of the start page and the target page is less than a predetermined value and/or the duration of the overlapping state reaches the predetermined time, directly entering into step 560, at least one icon is added to the target page. Here, there is a step 550 of comparing the number of vacant spots within the target page with the number of the selected icons within the start page before step 560. Here, preferably, the step of calculating the number of vacant spots within the target page and the number of the selected icons within the start page can be further included before step 550.

Specifically, the above steps can include the following steps according to the result of step 550.

When the comparison result of step 550 is that the number of vacant spots of the target page is more than or equal to the number of the selected icons of the start page, entering into step 560, all of the selected icons within the start page are added (i.e., copied and pasted) to the vacant spots within the target page.

Alternatively, when the comparison result of step 550 is that the number of vacant spots of the target page is less than the number of the selected targets of the start page, entering into step 590, the icons to be moved are re-selected according to the prompt of a pop-up window. Here, the pop-up window can prompt the number of vacant spots of the current target page and display a plurality of icons in a selected state. Thus, it is only required to cancel the selected states of a part of icons through the touch tool to complete the re-selection. After the icons are re-selected and determined according to the number of vacant spots of the target page, the selected icons are added to the vacant spots of the target page.

Alternatively, when the comparison result of step 550 is that the number of vacant spots within the target page is less than the number of the selected icons within the start page, the above step 590 can be omitted and step 591 is directly performed, here, step 591 can be performed to add the front icons ranked in the start page are added to the target page by default according to the number of the vacant spots of the target page. Accordingly, step 590 can be omitted to further improve efficiency.

Alternatively, when the comparison result of step 550 is that the number of vacant spots of the target page is less than the number of the selected targets of the start page, entering into step 590, at least one icon that can be placed in the start page is selected from the target page according to the prompt of a pop-up window. Here, the pop-up window can prompt the number of vacant spots of the current target page. Meanwhile, the pop-up window can further display the icons within the target page and accordingly a plurality of icons that can be placed in the start page are selected through the touch tool.

When the number of vacant spots within the target page is less than the number of the icons within the start page, the positions of the selected icons from the target page are exchanged with the positions of the selected icons in the start page.

Accordingly, a sufficient place is made in the target page for the selected icons of the start page through the above steps 590 and 591, and meanwhile unnecessary icons within the target page can be moved to the start page, thereby further improving efficiency.

Then, entering into step 570, various information about pages and icons in the database are updated.

Accordingly, all of icons or a plurality of icons within one page can be conveniently moved to another page simultaneously through the above respective embodiments, which greatly improves the efficiency of managing the icons of the touch-type portable terminal.

When the overlapping ratio of the start page and the target page is more than the predetermined value, entering into step 580, the start page is placed in front of the target page. That is, when the overlapping ratio of the start page and the target page is more than the predetermined value, only the position transformation operation between pages is performed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An method of moving an icon in a portable terminal, comprising:

displaying a plurality of pages on an interface of the portable terminal in a thumbnail form, each of the plurality of pages comprising one or more icons;

detecting a selection input from a user to select a start page including one or more icons to be moved to a target page among the displayed plurality of pages;

detecting a movement of the selected start page toward the target page in response to the selection input;

determining an overlapping ratio or a duration of an overlapping state, between the start page and the target page;

comparing a number of vacant spots the target page with a number of all of icons within the start page when the overlapping ratio of the start page and the target page is less than a predetermined value or the duration of the overlapping state of the start page and the target page reaches a predetermined time;

adding all of the icons within the start page to the vacant spots within the target page when the number of the vacant spots within the target page is more than or equal to the number of all of the icons within the start page;

displaying a pop up window, when the number of the vacant spots within the target page is less than the number of all of the icons from the start page, wherein the pop up window displays at least a portion of all of the icons from the start page and a notification information comprising the number of the vacant spots of the target page;

detecting an input from the user to re-select one or more icons according to the number of the vacant spots to be moved to the target page through the pop up window; and in response to detecting the input for re-selecting the one or more icons, adding the re-selected one or more icons to the vacant spots of the target page.

2. The method of claim 1, wherein the start page is placed in front of the target page when an overlapping ratio is more than the predetermined value.

3. The method of claim 1, wherein the method further comprises before comparing the number of the vacant spots within the target page with the number of all of the icons within the start page, calculating the number of the vacant spots within the target page and the number of all of the icons within the start page.

4. The method of claim 3, wherein front icons ranked in all of the icons within the start page a number of which is equivalent to the number of the vacant spots are added to the vacant spots of the target page according to the number of the vacant spots, when the number of the vacant spots within the target page is less than the number of all of the icons within the start page.

5. A method to move an icon in a portable terminal, the method comprising:

detecting a first input from a user to select one or more icons which are displayed on an interface of the portable terminal within a start page, after a plurality of pages including the start page are simultaneously displayed on the interface in a thumbnail form;

detecting a second input from the user to select the start page to be moved to a target page among the plurality of pages which are displayed on the interface;

moving the selected start page to the target page in response to the second input and the corresponding two pages are overlapped;

determining an overlapping ratio of the two pages or a duration of an overlapping state between the start page and the target page;

comparing a number of vacant spots within the target page with a number of the selected one or more icons within the start page when the overlapping ratio of the two pages is less than a predetermined value or the duration of the overlapping state between the start page and the target page reaches a predetermined time;

adding the selected one or more icons within the selected start page to the vacant spots of the target page when the number of the vacant spots within the target page is more than or equal to the number of the selected one or more icons within the start page;

displaying a pop up window, when the number of the vacant spots within the target page is less than the number of the selected one or more icons within the start page, wherein the pop up window displays at least a portion of the selected one or more icons from the start page and a notification information comprising the number of the vacant spots of the target page;

detecting an input from the user to re-select one or more icons according to the number of the vacant spots to be moved to the target page through the pop up window; and in response to detecting the input for re-selecting the one or more icons, adding the re-selected one or more icons to the vacant spots of the target page.

6. The method of claim 5, wherein the start page is placed in front of the target page when an overlapping ratio is more than the predetermined value.

7. The method of claim 5, further comprising: before adding the selected one or more icons within the start page to the vacant spots of the target page, comparing the number of the vacant spots within the target page with the number of the selected one or more icons within the start page.

8. The method of claim 7, further comprising: before comparing the number of the vacant spots within the target page with the number of the selected one or more icons within the start page, calculating the number the vacant spots within the target page and the number of the selected one or more icons within the start page.

9. The method of claim 7, wherein adding the selected one or more icons comprises all of the selected one or more icons within the start page are added to the vacant spots within the target page when the number of the vacant spots within the target page is more than or equal to the number of the selected one or more icons within the start page.

10. The method of claim 7, wherein front icons ranked in the selected one or more icons within the start page a number of which is equivalent to the number of the vacant spots are added to the target page according to the number of the vacant spots, when the number of the vacant spots within the target page is less than the number of the selected one or more icons within the start page.

11. A portable terminal having a display configured to display icons and a start page including one or more icons, the portable terminal comprising:

the display configured to display a plurality of pages on the interface in a thumbnail form, wherein each of the plurality of pages comprise one or more icons; and a controller comprising a processor configured to:

detect a selection input from a user to select a start page to be moved to a target page and detect a movement of the selected start page in response to the selection input according to a guide of a touch tool;

determine an overlapping ratio of the start page and the target page or a duration of an overlapping state when the start page moves to overlap a part of the target page;

compare a number of vacant spots within the target page with a number of all of icons within the start page when the overlapping ratio is less than a predetermined value;

add all of the icons within the start page to the vacant spot of the target page when the number of the vacant spots within the target page is more than or equal to the number of all of the icons within the tart pane;

display a pop up window when the number of the vacant stets within the target page is less than the number of all of the icons within the start page, wherein the pop up window displays at least a portion of all of the icons from the start page and a notification information comprising the number of the vacant spots of the target page, detect an input from the user to re-select one or more icons according to the number of the vacant spots to be moved to the target page through the pop up window; and in response to detecting the input for re-selecting the one or more icons, add the re-selected one or more icons to the vacant spots of the target page.

12. The portable terminal of claim 11, wherein the controller is configured to detect the number of all of the icons within the start page and the number of the vacant spots within the target page.

13. The portable terminal of claim 11, wherein the controller is configured to arrange the start page in front of the target page when an overlapping ratio is more than the predetermined value.

14. The portable terminal of claim 11, wherein the controller is configured to exchange positions of selected icons of the target page with positions of the selected one or more icons of the start page.

* * * * *